United States Patent [19]

Tanaka et al.

[11] Patent Number: 4,504,258
[45] Date of Patent: Mar. 12, 1985

[54] POWER TRANSMISSION BELT

[75] Inventors: Hideaki Tanaka, Kobe; Kunihiro Fujita, Hyogo; Mitsuhiro Ushiroda, Kobe, all of Japan

[73] Assignee: Mitsuboshi Belting Ltd., Kobe, Japan

[21] Appl. No.: 475,442

[22] Filed: Mar. 15, 1983

[30] Foreign Application Priority Data

Sep. 17, 1981 [JP] Japan ............... 56-138574[U]

[51] Int. Cl.³ ............................................. B65G 15/34
[52] U.S. Cl. ................................... 474/263; 198/847; 428/292; 428/293; 428/294; 428/295; 428/492
[58] Field of Search ............... 198/846, 847; 428/292, 428/294, 295, 492; 74/232; 474/263, 264, 260, 261

[56] References Cited

U.S. PATENT DOCUMENTS

| | | | |
|---|---|---|---|
| 2,446,310 | 8/1948 | Steinke | 474/263 |
| 3,122,934 | 3/1964 | Fike | 428/222 |
| 3,545,293 | 12/1970 | Marzocchi et al. | 474/260 |
| 3,658,108 | 4/1972 | Marzocchi et al. | 152/357 A |
| 4,083,261 | 4/1978 | Speer et al. | 74/233 |
| 4,126,053 | 11/1978 | Cicognani | 474/263 |
| 4,127,039 | 11/1978 | Hollaway | 428/295 |
| 4,255,147 | 3/1981 | Miranti | 474/263 |
| 4,299,587 | 11/1981 | Imamura | 474/263 |
| 4,305,714 | 12/1981 | Renshaw | 474/250 |
| 4,355,069 | 10/1982 | Standley | 474/260 |

FOREIGN PATENT DOCUMENTS 2754793  6/1978  Fed. Rep. of Germany ...... 474/263

Primary Examiner—James J. Bell
Attorney, Agent, or Firm—Wood, Dalton, Phillips, Mason & Rowe

[57] ABSTRACT

A V-belt construction wherein a belt body defining an inner compression rubber portion and an outer compression rubber portion with tensile cords extending longitudinally therethrough is provided with a plurality of transversely extending reinforcing staple fibers distributed in the outer compression rubber portion such that the tensile cords are embedded within the distribution of the staple fibers. V-belts of the invention are provided both in raw edge and fabric-covered form. The rubber in which the tensile cords are embedded preferably has a hardness in the range of approximately 70° to 90°. Different distributions of the transverse staple fibers are disclosed.

19 Claims, 11 Drawing Figures

POWER TRANSMISSION BELT

DESCRIPTION

1. Technical Field

This invention relates to power transmission belts and in particular to power transmission V-belts adapted to provide high power transmission.

2. Background Art

In one form of power transmission belt, the belt has a trapezoidal cross section which is generally complementary to the groove of the pulley with which the belt is entrained in the drive system. However, under high power transmission, the belt tends to be deformed inwardly into the pulley groove, causing excessive loading and stress concentration on the tension member of the belt. As a result of the deformation, cracks can form in the belt resulting in shortened useful life of the belt.

Another problem found in the conventional V-belts of this type is the elongation which tends to occur under driving conditions. Such elongation lowers the tension of the belt about the pulleys, causing slipping and resultant degradation of the side surfaces of the belt due to frictional heating thereof. Such degradation includes cracking and belt heat aging, again shortening the useful life of the belt undesirably.

In a number of the prior art drive systems, the belt is caused to be reversely bent around one or more pulleys or rollers. Commonly, the bending in this reverse direction causes cracking at the bottom of the belt, again shortening the useful life thereof.

DISCLOSURE OF INVENTION

The present invention comprehends an improved power transmission belt including a belt body having an inner compression rubber portion, an outer tension rubber portion, and tensile cords extending longitudinally of the belt. A plurality of transversely extending reinforcing staple fibers is distributed in the outer rubber portion, and the tensile cords are embedded in the outer rubber portion within the distribution of the staple fibers.

In the illustrated embodiment, the staple fibers have a length in the range of approximately 1 mm to approximately 20 mm.

The staple fibers illustratively comprise metal fibers, synthetic resin fibers, etc., and in the illustrated embodiment, define cut ends.

The outer compression rubber portion is formed of a rubber having a hardness of approximately 70° to 90° as measured on a JIS hardness meter.

In the illustrated embodiment, the staple fibers are present in an amount by weight of approximately 5 to 50 parts per 100 parts rubber.

In one form, the belt comprises a raw edge belt and in a modified form, the belt is provided with an outer covering fabric.

The fabric, in the illustrated embodiment, is bias-laid.

The belt construction, in the illustrated embodiment, may further include a plurality of transversely extending reinforcing staple fibers distributed in the inner compression rubber portion.

In one form, the reinforcing staple fibers are distributed throughout the entire cross section of the belt body.

The belt may be provided with an outer covering fabric which similarly may be bias-laid.

In one embodiment, the outer compression portion includes an outermost portion free of reinforcing staple fibers.

In the illustrated embodiment, the tensile cords are disposed substantially midway between the inner and outer boundaries of the staple fiber distribution.

In the illustrated embodiment, the depth of the outermost portion free of the reinforcing staple fibers is less than the depth of the compression portion provided with the fibers.

The improved V-belt manufacture of the present invention is extremely simple and economical of construction while yet providing long, troublefree life in avoidance of the deformation problems of the prior art belts, as discussed above.

BRIEF DESCRIPTION OF THE DRAWING

Other features and advantages of the invention will be apparent from the following description taken in connection with the accompanying drawing wherein.

BEST MODE FOR CARRYING OUT THE INVENTION

The present invention is concerned with a power transmission belt, such as belt 10, for transmitting power between a driver pulley 11 and a driven pulley 12.

Figure 1:
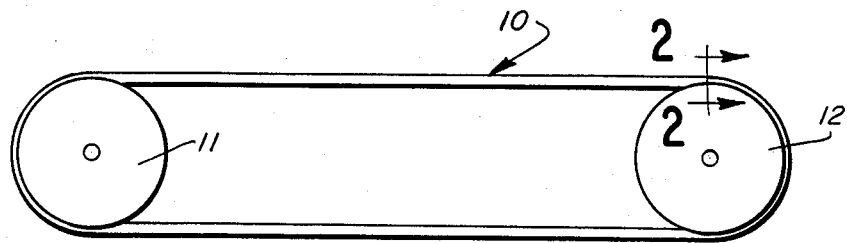
FIG. 1 is a schematic elevation illustrating a drive system utilizing a V-belt embodying the invention.
Figure 2:
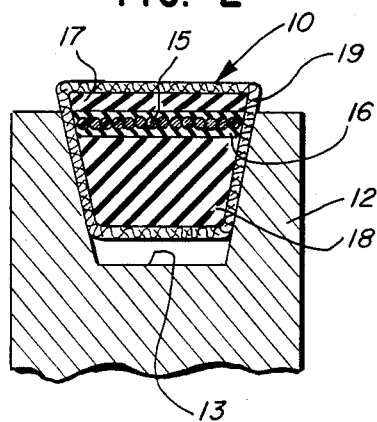
FIG. 2 is a fragmentary transverse section illustrating a conventional prior art V-belt entrained in a pulley groove.

As shown in FIG. 2, the V-belt seats in a groove 13 in the pulley when entrained thereabout. The groove is complementary in cross section to the cross section of the V-belt so as to have a driving or driven fit therebetween.

Figure 3:
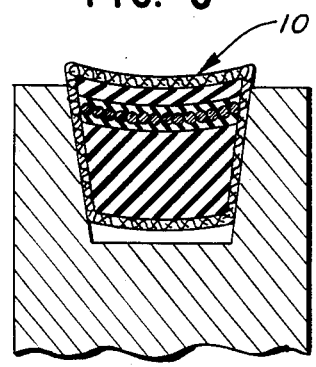
FIG. 3 is a fragmentary cross section illustrating the deformation of such a prior art V-belt under load.
Figure 4:
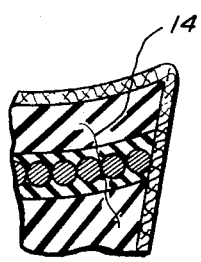
FIG. 4 is a fragmentary transverse section illustrating the formation of a crack in the V-belt resulting from such deformation.

However, as indicated in FIG. 3, when high loads are transmitted by the belt, the belt tends to deform inwardly into the groove introducing stress forces in the body of the belt, tending to result in the formation of cracks, such as crack 14 illustrated in FIG. 4.

As illustrated in FIG. 2, the conventional prior art belts embed tensile cords 15 in a layer 16 of cushion rubber. A tension rubber portion 17 is provided outwardly of the cushion rubber portion 16, and a compression rubber portion 18 is provided inwardly thereof. In the embodiment of FIG. 2, the belt 10 comprises a covered belt having a cover of fabric 19 wrapped thereabout.

Figure 6:
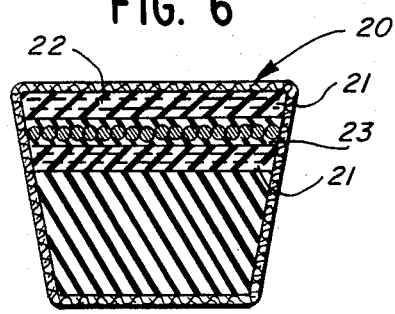
FIG. 6 is a transverse section of a conventional V-belt utilizing transverse staple fibers in areas spaced from the tensile cord cushion rubber.

Referring to FIG. 6, a modified form of prior art V-belt generally designated 20 is shown to comprise a belt generally similar to belt 10 but wherein a plurality of short staple reinforcing fibers 21 are provided in the tension rubber portion 22 in which the cushion rubber portion 23 is disposed. Such a V-belt is disclosed in Japanese Utility Model application, Ser. No. 47933/1980, U.M. Ser. No. 55-47933, which application is owned by the assignee hereof.

While the V-belt 20 provides an improvement over the conventional V-belt 10, under high load conditions, some deformation of the V-belt occurs so that deterioration of the cushion rubber remains a problem. thus, formation of cracks 14 is not effectively eliminated.

In addition, each of the prior art belts 10 and 20 is deformed under high tension so as to cause movement of the tensile cords in the rubber so as to cause overlapping displacement thereof aggravating the degradation problem. Such degradation further causes wear at the sides of the belt as a result of increased friction with the pulley groove sidewalls. The resultant generation of heat aggravates the cracking problem and general belt heat aging problem.

Another problem arises in such prior art belts in that, in certain applications, the belt is reversely bent about one or more pulleys or rollers in the drive system. The prior art belts tend to have substantial cracking problems resulting from such reverse bending.

Thus, the prior art belts both with and without the transverse reinforcing staple fibers, as illustrated in the belts 10 and 20 discussed above, have a shortened useful life, causing undesirable maintenance problems and increased cost in the use of the drive systems.

Figure 5:
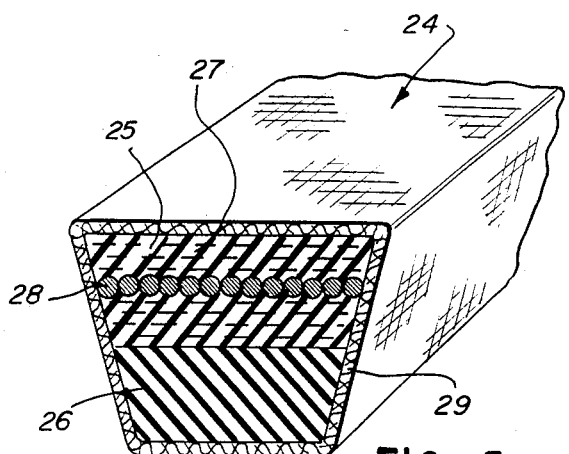
FIG. 5 is a fragmentary perspective view of a cut portion of a V-belt embodying the invention.

Referring to FIG. 5, the present invention comprehends an improved V-belt structure generally designated 24 which has been found to overcome the problems of the prior art belts discussed above in a novel and simple manner.

More specifically, as shown in FIG. 5, V-belt 24 includes an outer tension rubber portion 25 and an inner compression rubber portion 26. Transversely extending reinforcing staple fibers 27 are uniformly dispersed in the outer rubber portion both outwardly and inwardly of the tensile cords 28 embedded in the tension rubber section.

In the illustrated embodiment, the staple fibers 27 have a length in the range of approximately 1 mm to approximately 20 mm. The fibers may be formed of a suitable fibrous material, such as cotton yarn, rayon, nylon, teteron (polyester resin), vinylon (polyvinyl alcohol), etc.

The fibers are preferably cut to the desired length so as to define cut ends, providing improved retention of the fibers in the cushion rubber. Preferably, the transversely extending reinforcing fibers 27 are present in a ratio of approximately 5 to 50 percent by weight. Preferably, the portion tension rubber 25 has a surface hardness of approximately 70° to 90°, as measured on a JIS hardness meter. It has been found that where the hardness is outside the preferred range, buckling resistance is poor.

The invention further comprehends the provision of cord fabrics or fabrics consisting of spun or twisted yarns, such as cotton, rayon, nylon, polyester, etc. yarn, may be used in providing improved deformation resistance.

The tensile cord members may comprise conventional cords formed of suitable high strength material, such as polyester resin, aliphatic polyamide resin, aromatic polyamide resin (Kevlar) etc. The tension and compression rubber sections may be formed of suitable rubber, such as natural rubber, chloroprene rubber, styrene-butadiene rubber blends, etc.

In the illustrated embodiment, V-belt 24 comprises a covered belt having an outer fabric covering 29. The fabric is laminated, or adhered, to the outer surface of the V-belt rubber and may be bias-laid. The fabric may comprise a rubber-coated fabric having one or more layers wherein the warp and weft are woven at a wide crossing angle, such as in the range of approximately 90° to 140°. The fabric may be formed of cotton, nylon, polyester, etc., yarns, as desired.

The improved V-belt 24 is advantageously adapted for use in high power transmission drive systems, such as in farming apparatus, snow plows, etc.

Figure 7:
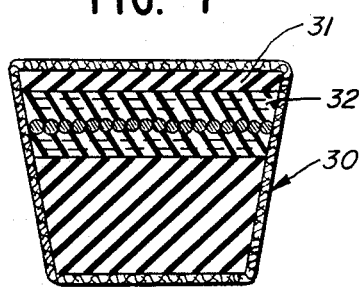
FIG. 7 is a transverse section of a modified form of V-belt embodying the invention.

As illustrated in FIGS. 7-11, the improved V-belt construction of the present invention may be utilized in a number of different forms. Thus, as illustrated in FIG. 7, a modified form of V-belt generally designated 30 embodying the invention is shown to comprise a V-belt generally similar to V-belt 24, but wherein an outer portion 31 of the tension rubber section 32 is free of the transverse reinforcing staple fibers.

Figure 8:
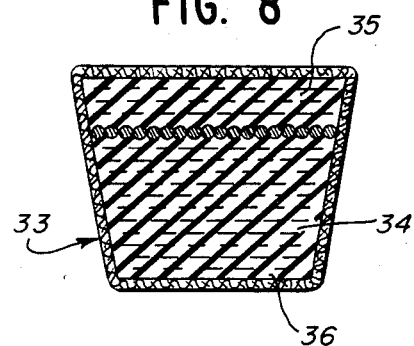
FIG. 8 is a transverse section of another modified form of V-belt embodying the invention.

Referring to FIG. 8, still another modified form of V-belt embodying the invention generally designated 33 is shown to comprise a V-belt generally similar to V-belt 24, but wherein the staple fibers 34 are distributed throughout both the tension rubber section 35 and compression rubber section 36.

Figure 9:
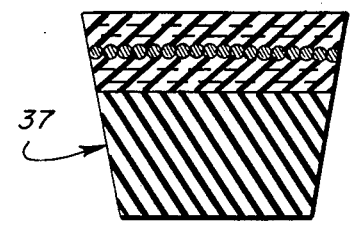
FIG. 9 is a transverse section of still another form of V-belt embodying the invention.

As further illustrated in FIG. 9, a further modified form of V-belt embodying the invention generally designated 37 is shown to comprise a V-belt generally similar to V-belt 24, but wherein the cover fabric 29 is omitted. Thus, V-belt 37 comprises a raw edge V-belt otherwise similar to the covered V-belt 24.

Figure 10:
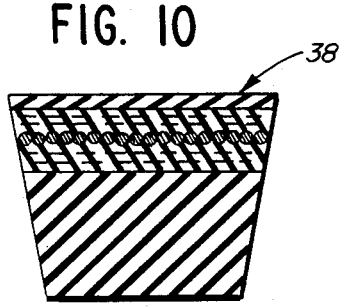
FIG. 10 is a transverse section of yet another modified form of V-belt embodying the invention.

Another modified form of raw edge V-belt generally designated 38 is illustrated in FIG. 10 as comprising a V-belt generally similar to V-belt 30 of FIG. 7, but wherein the outer fabric is omitted.

Figure 11:
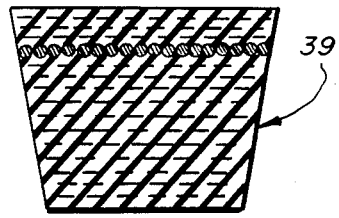
FIG. 11 is a transverse section of a further modified form of V-belt embodying the invention.

Another modified form of V-belt generally designated 39 is illustrated in FIG. 11 as comprising a V-belt generally similar to V-belt 33, but wherein the outer fabric is omitted.

Thus, FIGS. 9-11 illustrate additional embodiments of the invention comprehended within the broad scope thereof. As will be obvious to those skilled in the art, other modifications of the V-belt construction may be utilized within the broad scope of the invention as discussed above.

INDUSTRIAL APPLICABILITY

The provision of the reinforcing staple fibers in the rubber in which the tensile cord is embedded provides a substantially improved resistance to degradation and cracking and, thus, improved long troublefree life of the V-belt. Illustratively, as indicated in Table I set out below, belts of the present invention were found to provide substantial increase in the useful life of the belt. In carrying out the test, a B-type V-belt 2500 mm in circumferential length, 16.5 mm wide, and 11.0 mm high, was formed both in the configuration of the V-belt 24 of the present invention and the prior art V-belt 20. An LB-type V-belt 1100 mm in circumferential length, 16.5 mm wide and 9.5 mm high, was formed in both configurations. The running test was conducted by driving the belts in a system having a drive pulley 114 mm in diameter, a driven pulley 114 mm in diameter, a tension pulley 152 mm in diameter engaging the outer surface of the belt so as to provide a reverse bend therein, and a second tension pulley 106 mm in diameter engaging the compression portion of the belt.

TABLE I

|  | | Conventional Belt | Belt of This Invention |
|---|---|---|---|
| B-type | Running life | 50 hrs. | 200 hrs. |
| LB-type | Running life | 88 hrs. | 117 hrs. |

Thus, as shown, the belts of the present invention were found to have had a useful life extended approximately 1.3 to 4 times that of the conventional fiber-reinforced belt 20.

Provision of the staple reinforcing fibers in the rubber in which the tensile cord is embedded provides a barrier against vertical and horizontal movement of the tension cord members. Such reinforcing provides improved resistance to vertical cracking in both the tension and compression rubber portions and effectively prevents the entanglement of the tensile cords commonly occurring in the belts of the prior art.

As a result, the improved belt constructions of the present invention provide extended useful life, improved performance and power transmission efficiency.

The foregoing disclosure of specific embodiments is illustrative of the broad inventive concepts comprehended by the invention.

We claim:

1. In a V-belt having a belt body comprising an inner compression rubber portion, an outer tension rubber portion contiguous with said compression portion, and tensile cords extending longitudinally of the belt, the improvement comprising
   a plurality of primarily transversely extending reinforcing staple fibers distributed in at least one of said rubber portions, said tensile cords being embedded within the distribution of said staple fibers fully within a single one of said rubber portions to be spaced from the other rubber portion.

2. The V-belt structure of claim 1 wherein said staple fibers have a length in the range of approximately 1 mm to approximately 20 mm.

3. The V-belt structure of claim 1 wherein said fibers comprise natural fibers.

4. The V-belt structure of claim 1 wherein said fibers comprise synthetic resin fibers.

5. The V-belt structure of claim 1 wherein said fibers define cut ends.

6. The V-belt structure of claim 1 wherein said outer compression rubber portion is formed of a rubber having a hardness of 70° to 90° as measured on a JIS hardness meter.

7. The V-belt structure of claim 1 wherein said staple fibers are present in an amount by weight of approximately 5 to 50 parts per 100 parts rubber.

8. The V-belt structure of claim 1 wherein said belt comprises a raw edge belt.

9. The V-belt structure of claim 1 wherein said belt is provided with an outer covering fabric.

10. The V-belt structure of claim 1 wherein said belt is provided with an outer bias-laid covering fabric.

11. In a V-belt having a belt body comprising an inner compression rubber portion, an outer compression rubber portion contiguous with said compression portion, and tensile cords extending longitudinally of the belt, the improvement comprising:
   a plurality of primarily transversely extending reinforcing staple fibers distributed in said outer tension rubber portion, said tensile cords being embedded within the distribution of said staple fibers fully within said outer tension rubber portion to be spaced from said compression rubber portion.

12. The V-belt structure of claim 11 wherein the reinforcing staple fibers are distributed throughout the entire cross section of the belt body.

13. The V-belt structure of claim 11 wherein said belt comprises a raw edge belt.

14. The V-belt structure of claim 11 wherein said belt is provided with an outer covering fabric.

15. The V-belt structure of claim 11 wherein said belt is provided with an outer bias-laid covering fabric.

16. In a V-belt having a belt body comprising an inner compression rubber portion, an outer tension rubber portion contiguous with said compression portion, and tensile cords extending longitudinally of the belt, the improvement comprising
   a plurality of primarily transversely extending reinforcing staple fibers distributed in said outer tension rubber portion, said tensile cords being embedded within the distribution of said staple fibers fully within said outer tension rubber portion to be spaced from said compression rubber portion, said outer tension rubber portion including an outermost portion free of said reinforcing staple fibers.

17. The V-belt structure of claim 16 wherein said tensile cords are disposed substantially midway between inner and outer boundaries of the staple fiber distribution.

18. The V-belt structure of claim 16 wherein the depth of the outermost portion is substantially less than the depth of the compression portion provided with said fibers.

19. The V-belt structure of claim 16 wherein the hardness of the rubber portion in which said tensile cords and staple fibers are embedded is in the range of approximately 70° to 90° and the hardness of said outermost portion free of said staple fibers is in the range of approximately 70° to 80°.

* * * * *